United States Patent [19]

Tuttle

[11] Patent Number: 5,494,495

[45] Date of Patent: Feb. 27, 1996

[54] METHOD OF FORMING BUTTON-TYPE BATTERIES

[75] Inventor: Mark E. Tuttle, Boise, Id.

[73] Assignee: Micron Communications, Inc., Boise, Id.

[21] Appl. No.: 321,251

[22] Filed: Oct. 11, 1994

[51] Int. Cl.$^6$ .................................................. H01M 6/02
[52] U.S. Cl. ........................................ 29/623.2; 429/174
[58] Field of Search ............................. 29/623.2, 623.3; 429/173, 174, 171

[56] References Cited

U.S. PATENT DOCUMENTS

| | | | |
|---|---|---|---|
| 2,422,045 | 7/1945 | Ruben | 136/107 |
| 2,712,565 | 8/1953 | Williams, Jr. | 136/107 |
| 2,951,891 | 9/1960 | Kempf | 136/169 |
| 3,096,217 | 10/1960 | Clune | 136/107 |
| 3,185,595 | 8/1960 | Schenk | 136/133 |
| 3,440,110 | 8/1965 | Arbter | 136/166 |
| 3,457,117 | 3/1967 | Angelovich | 136/133 |
| 3,673,000 | 6/1972 | Ruetschi | 136/107 |
| 3,708,343 | 1/1971 | Walsh | 136/133 |
| 3,713,896 | 1/1973 | Feldhake | 136/133 |
| 3,799,959 | 3/1974 | Epstein | 260/429 |
| 3,891,462 | 6/1975 | Langkau | 136/111 |
| 3,935,026 | 1/1976 | Howard | 136/20 |
| 3,993,508 | 11/1976 | Erlichman | 29/623.2 |
| 4,048,405 | 9/1977 | Megahed | 429/206 |
| 4,122,241 | 10/1978 | Ciliberti, Jr. et al. | 429/133 |
| 4,152,825 | 5/1979 | Bruneau | 29/623.2 |
| 4,216,045 | 8/1980 | Morioka | 156/242 |
| 4,263,380 | 4/1981 | Riedl | 429/162 |
| 4,374,909 | 2/1983 | Tucholski | 429/174 |
| 4,632,887 | 12/1986 | Jung | 429/181 |
| 5,227,264 | 8/1993 | Duval et al. | 429/153 |
| 5,300,373 | 4/1994 | Shackle | 429/152 |
| 5,314,507 | 5/1994 | Rossoll | 29/623.4 |

FOREIGN PATENT DOCUMENTS

| | | |
|---|---|---|
| 1099018 | 11/1959 | Germany. |
| 2201811 | 1/1972 | Germany. |

Primary Examiner—John S. Maples
Attorney, Agent, or Firm—Wells, St. John, Roberts, Gregory & Matkin

[57] ABSTRACT

A method of forming a button-type battery includes: a) providing a sheet of cathode material bonded to solid electrolyte material; b) cutting the cathode material and solid electrolyte material from the sheet into a plurality of composite cathode/solid electrolyte pieces which are individually sized and shaped to constitute the electrolyte and cathode components of a single button-type battery; c) providing a pair of first and second terminal housing members in facing juxtaposition to one another, the first and second terminal housing members having respective peripheries; d) providing one of the composite cathode/electrolyte pieces intermediate the juxtaposed first and second terminal housing members; e) providing an anode intermediate the juxtaposed first and second terminal housing members, the anode being positioned to electrically connect with one of the first or second terminal housing members and the solid electrolyte, and the cathode being positioned to electrically connect with the other of the first or second terminal housing members; f) providing electrically insulative sealing gasket material intermediate the first and second terminal housing member peripheries; and g) crimping the first and second terminal housing member peripheries together into an enclosed dry battery housing with the gasket material being interposed between the first and second terminal housing members to provide a fluid-tight seal and to provide electrical insulation therebetween. A button-type battery is also disclosed.

7 Claims, 5 Drawing Sheets

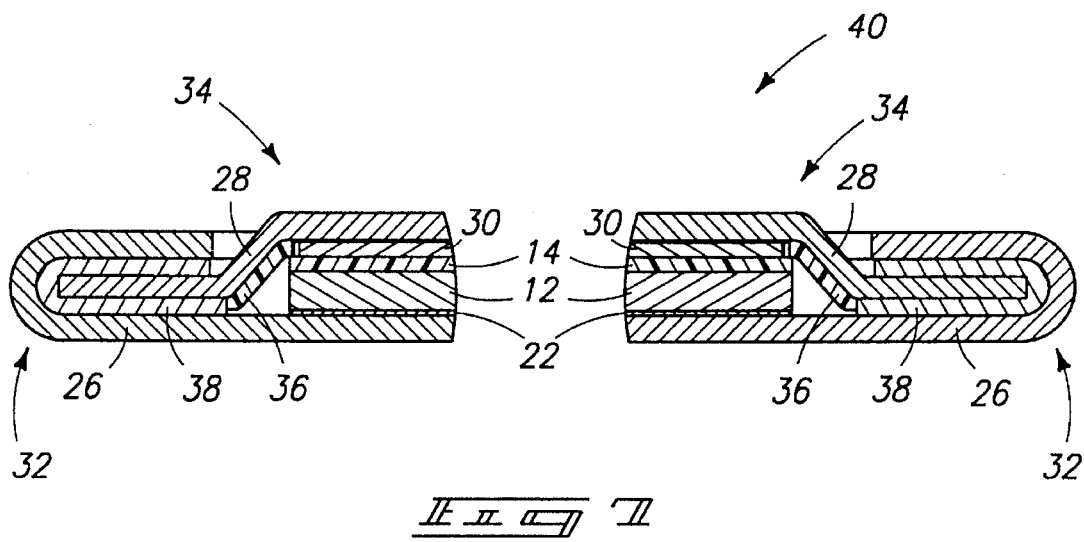
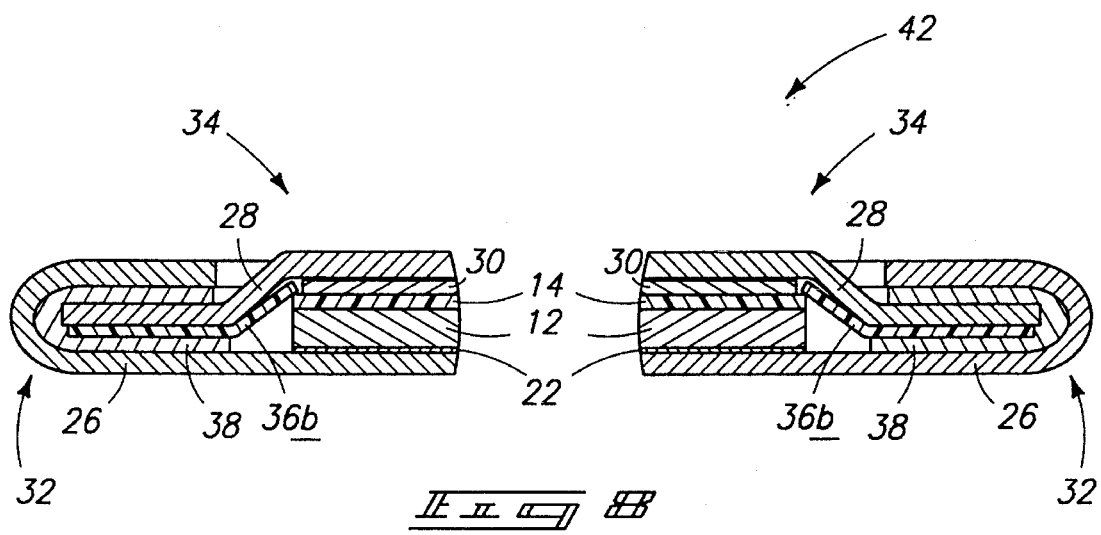

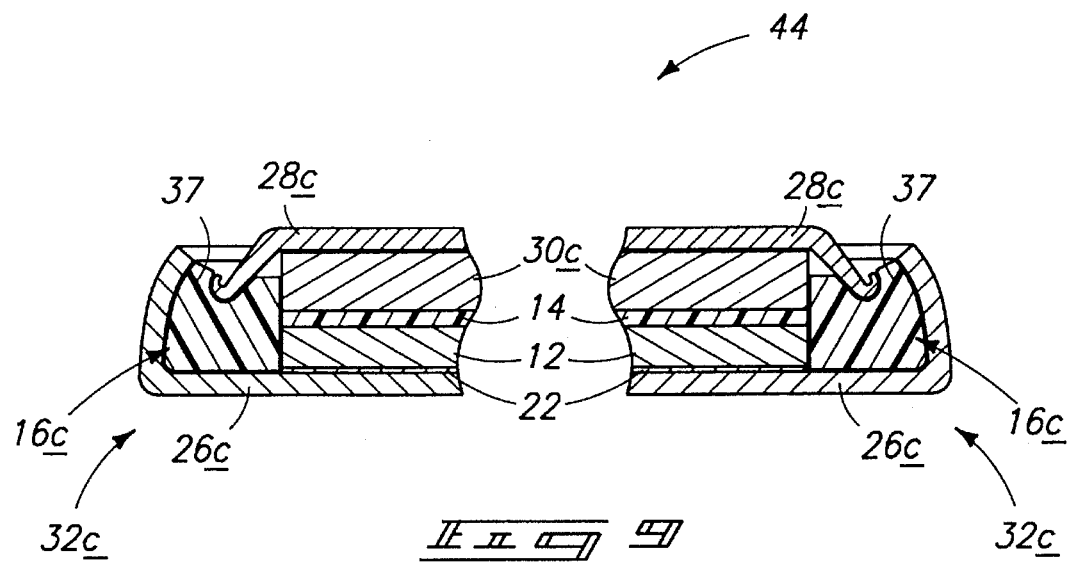
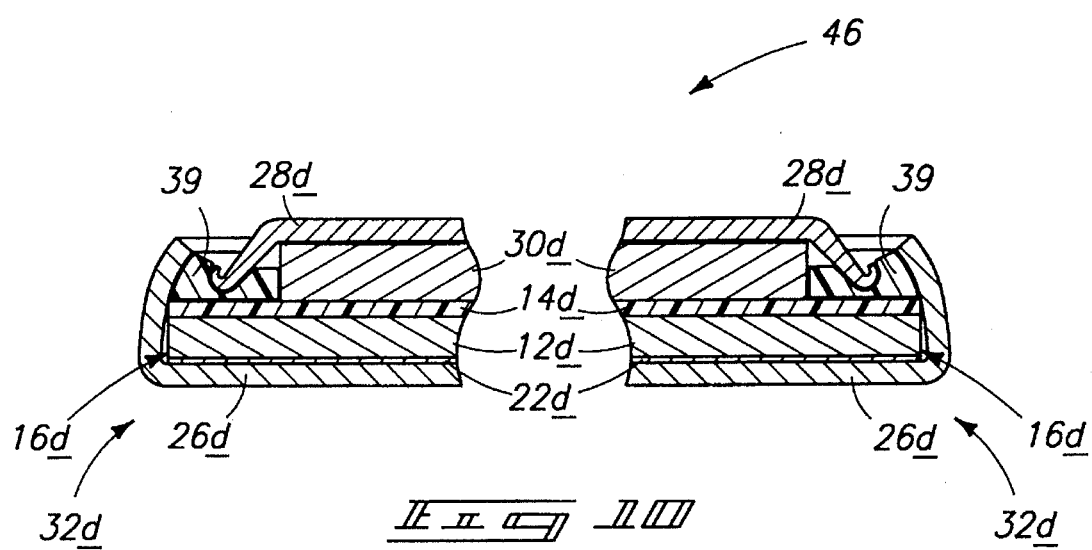

METHOD OF FORMING BUTTON-TYPE BATTERIES

TECHNICAL FIELD

This invention relates to button-type batteries and to methods of forming button-type batteries.

BACKGROUND OF THE INVENTION

Button-type batteries are small, thin energy cells that are commonly used in watches and other electronic devices requiring a thin profile. A conventional button-type battery includes two electrodes in the form of an anode and a cathode. These are separated by a porous separator. An electrolyte is present within pores of the separator. Alternately, a solid electrolyte which is positioned between and separates the cathode and anode is used without a separator.

These internal battery components are housed within a metal casing or housing formed by a lower conductive can and an upper conductive lid. A common prior art material for the can and lid is stainless steel. The can is typically in electrical contact with the cathode to form the positive battery terminal, and the lid is in electrical contact with the anode to form the negative battery terminal. The can and lid are crimped or pressed together to form a fluid-tight seal which entirely encloses the anode, cathode, separator, and electrolyte. An electrically insulating sealing gasket is provided within the primary seal between the lid and can to electrically isolate the two housing members.

This invention principally concerns the cathode and electrolyte components and their effect on assembly in button-type batteries.

BRIEF DESCRIPTION OF THE DRAWINGS

Preferred embodiments of the invention are described below with reference to the following accompanying drawings.

FIG. 7 is a diagrammatic fragmentary sectional view of a button-type battery apparatus in accordance with the invention.

FIG. 8 is a diagrammatic fragmentary sectional view of an alternate button-type battery apparatus in accordance with the invention.

FIG. 9 is a diagrammatic fragmentary sectional view of another alternate button-type battery apparatus in accordance with the invention.

FIG. 10 is a diagrammatic fragmentary sectional view of still another alternate button-type battery apparatus in accordance with the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In accordance with one aspect of the invention, a method of forming a button-type battery comprises the following steps:

providing a sheet of cathode material bonded to solid electrolyte material;

cutting the cathode material and solid electrolyte material from the sheet into a plurality of composite cathode/solid electrolyte pieces which are individually sized and shaped to constitute the electrolyte and cathode components of a single button-type battery;

providing a pair of first and second terminal housing members in facing juxtaposition to one another, the first and second terminal housing members having respective peripheries;

providing one of the composite cathode/electrolyte pieces intermediate the juxtaposed first and second terminal housing members;

providing an anode intermediate the juxtaposed first and second terminal housing members, the anode being positioned to electrically connect with one of the first or second terminal housing members and the solid electrolyte, and the cathode being positioned to electrically connect with the other of the first or second terminal housing members;

providing electrically insulative sealing gasket material intermediate the first and second terminal housing member peripheries; and crimping the first and second terminal housing member peripheries together into an enclosed dry battery housing with the gasket material being interposed between the first and second terminal housing members to provide a fluid-tight seal and to provide electrical insulation therebetween.

In accordance with another aspect of the invention, a button-type battery comprises:

a cathode having a solid electrolyte bonded thereto;

an anode positioned against the solid electrolyte;

a conductive first terminal housing member in electrical contact with one of the anode or the cathode, the first terminal housing member having a periphery;

a conductive second terminal housing member in electrical contact with the other of the anode or the cathode, the second terminal housing member having a periphery; and the first and second terminal housing members forming an enclosed dry battery housing which holds and protects the anode and the cathode, an electrically insulative gasket material being received intermediate the first and second terminal housing member peripheries to provide a fluid-tight seal and to provide electrical insulation between the first and second terminal housing members.

Figure 1:
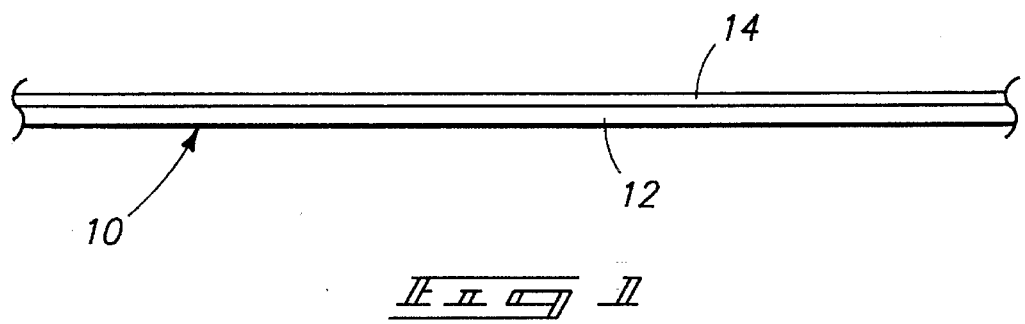
FIG. 1 is a diagrammatic sectional view of a cathode/solid electrolyte sheet composite at one processing step in accordance with the invention.

More particularly with reference to the Figures, FIG. 1 illustrates a sheet 10 of cathode material 12 bonded to or with solid electrolyte material 14. An example material of construction for cathode material 12 would be a combination of manganese (IV) oxide, carbon, and tetrafluoroethylene resin (PTFE), with the components being mixed to fibrillate the PTFE and form a rubber sheet, such as disclosed in U.S. Pat. No. 4,216,045. An example preferred thickness of layer 12 is 8 mils (0.2032 mm). An example solid electrolyte material is a slot die coated polyethylene oxide containing a lithium hexafluoroarsenate salt, with an example thickness being 1 mil.

Figure 2:
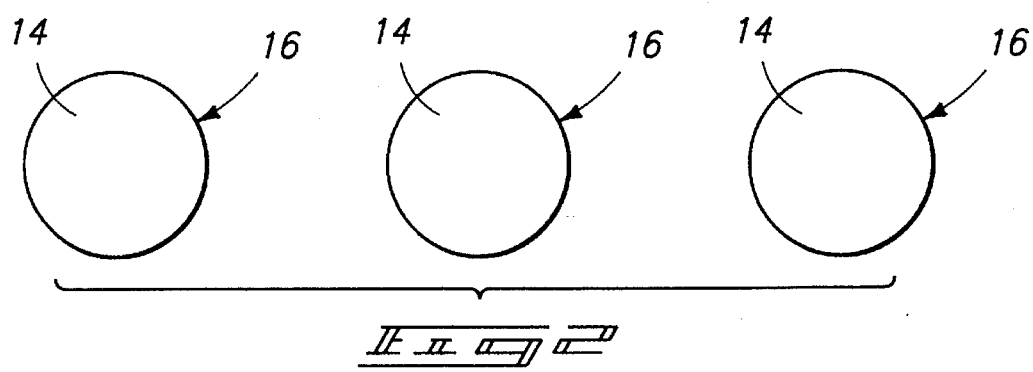
FIG. 2 is a top view of portions of the FIG. 1 sheet at a processing step subsequent to that shown by FIG. 1.
Figure 3:
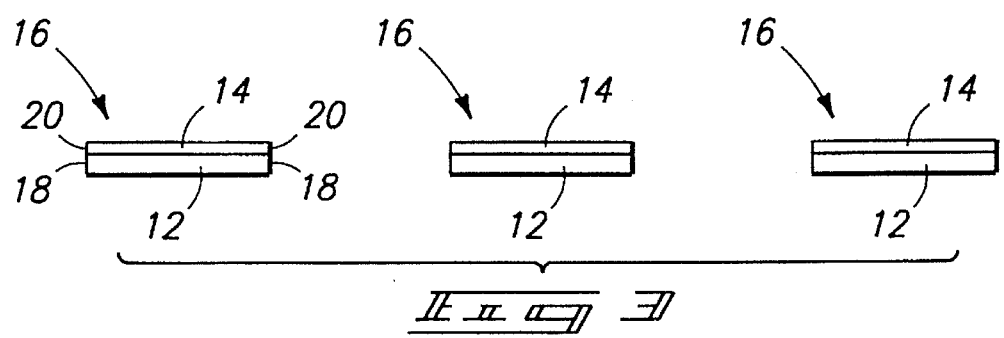
FIG. 3 is a side sectional view of FIG. 2.

Referring to FIGS. 2 and 3, cathode material 12 and solid electrolyte material 14 have been cut from sheet 10 into a plurality of composite cathode/solid electrolyte pieces 16 which are individually sized and shaped to constitute the electrolyte and cathode components of a single button-type battery. The cutting step defines cathode peripheral edges 18 and solid electrolyte peripheral edges 20 which align with one another vertically as shown.

Figure 4:
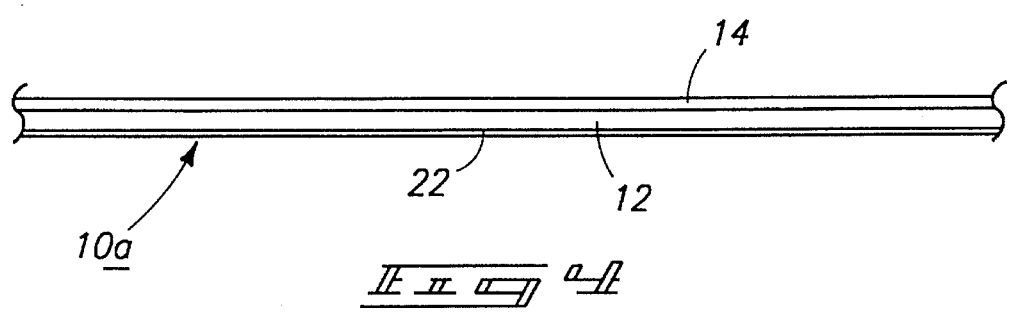
FIG. 4 is a diagrammatic sectional view of an alternate embodiment cathode/solid electrolyte sheet.

An alternate sheet 10a of cathode material bonded to solid electrolyte material is shown in FIG. 4. Sheet 10a is provided with a conductive substrate 22 to which cathode material 12 is adhered. An example and preferred material for conductive substrate 22 is stainless steel foil having a nominal thickness of 2 mils. The purpose of substrate 22 is to provide mechanical support and intimate electrical contact to the cathode.

Figure 5:
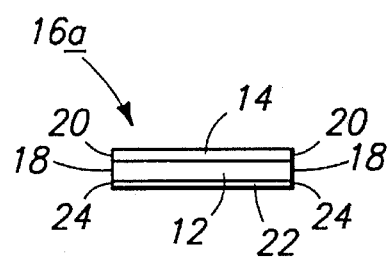
FIG. 5 is a side sectional view of a cut-out portion of the FIG. 4 sheet.

Referring to FIG. 5, the cutting step in such instance also preferably comprises cutting through conductive substrate 22 to define a composite piece 16a of the desired cathode and electrolyte material. Such will define conductive substrate peripheral edges 24 which align with peripheral edges 18 and 20 of cathode material 12 and solid electrolyte material 14, respectively. The discussion proceeds with reference to piece 16a which is utilized as a component within a single button-type battery.

Figure 6:
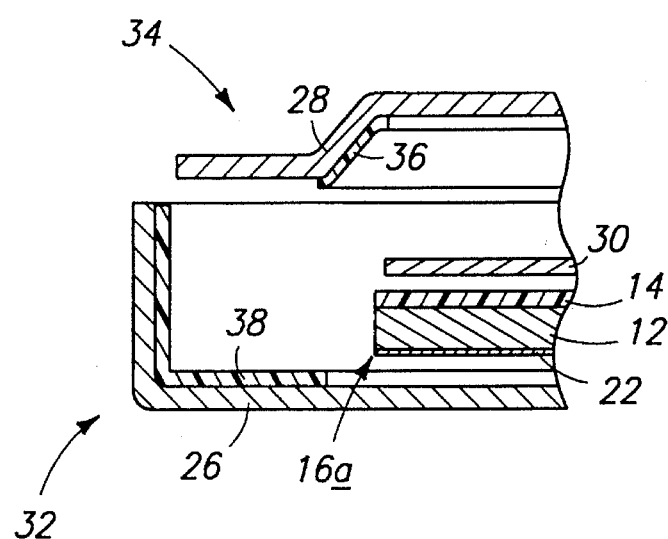
FIG. 6 is an enlarged diagrammatic fragmentary view of button-type battery components positioned for assembly in accordance with the invention.

Referring to FIG. 6, a pair of first and second terminal housing members 26 and 28, respectively, are provided in facing juxtaposition to one another. First terminal housing member 26 comprises a can or container for the button-type battery, while second terminal housing member 28 comprises a lid for the button-type battery. An example material of construction is stainless steel or nickel coated stainless steel having a nominal thickness of from 4 mils to 10 mils.

Composite cathode/electrolyte piece 16a is provided intermediate first terminal housing member 26 and second terminal housing member 28. An anode 30 is also provided intermediate juxtaposed first terminal housing member 26 and second terminal housing member 28. An example and preferred material of construction for anode 30 is elemental lithium. Anode 30 is positioned to electrically contact and connect with second terminal housing member 28 and electrolyte 14, while cathode material 12 is positioned to electrically connect with first terminal housing member 26 through conductive substrate 22.

First terminal housing member 26 has a peripheral region 32, while second terminal housing member 28 has a peripheral region 34. Electrically insulative sealing gasket material is provided intermediate first terminal housing member periphery 32 and second terminal housing member periphery 34. In this particular embodiment, gasket material is provided in the form of an adhered gasket layer 36 against second terminal housing member periphery 34, and a gasket layer 38 provided against first terminal housing member 26. Example gasket materials include polypropylene or polyethylene.

Referring to FIG. 7, the components are brought tightly together, and first and second terminal housing member peripheries 32 and 34 crimped together into an enclosed dry battery housing 40. The gasket material is interposed between the first and second terminal housing members to provide a fluid-tight seal and to provide electrical insulation therebetween. Insulating material 36 may not necessarily be in the seal, but desirably covers the entire side of the cathode. Cathode conductive substrate 22 bears against first terminal housing member 26 to provide intimate electrical connection therewith. Anode 30 has a smaller diameter than that of cathode material 12 and bonded solid electrolyte 14. Gasket material 36 is preferably received atop solid electrolyte 14 to prevent any tendency of lithium from anode 30 to creep to first terminal housing member 26 and cathode material 12.

Alternate embodiments are of course contemplated in accordance with the invention. For example, FIGS. 8-10 show alternate embodiment button-type batteries in accordance with the invention. Like numerals from the first described embodiment are utilized where appropriate, with different suffix designations being utilized to indicate differences. FIG. 8 illustrates a button-type battery 42 employing a different or modified sealing gasket arrangement. Here, a separate washer-shaped gasket 36b, which is not bonded to second terminal housing member 28, is utilized in place of adhered gasket material 36.

FIG. 9 illustrates an alternate button-type battery 44 employing a different peripheral gasket 37. Peripheral or perimeter gasket 37 is not bonded to either of first terminal housing member 26c or second terminal housing member 28c, and comprises a separate component which is sized and shaped to extend above cathode 12 and bonded solid electrolyte 14 to prevent shorting. The size and shape of the first and second terminal housing members, and the resulting crimp, is modified accordingly.

FIG. 10 illustrates still another alternate embodiment button-type battery 46. Such includes a modified bonded cathode and solid electrolyte construction 16d. Composite piece 16d is larger in diameter than the previously described embodiment 16a. A modified perimeter sealing gasket 39 overlies solid electrolyte 14d and provides sealing and electrical isolation between first terminal housing member 26d and second terminal housing member 28d, as shown.

Figure 11:
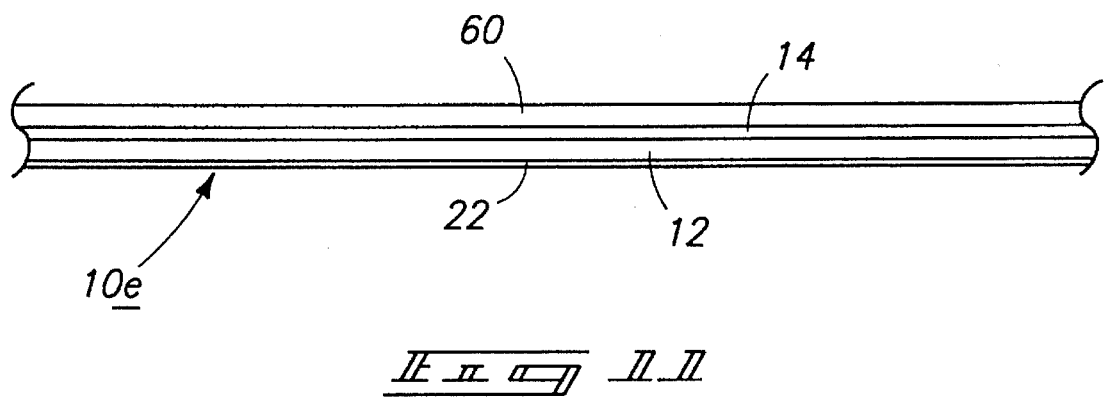
FIG. 11 is a diagrammatic sectional view of an alternate embodiment cathode/solid electrolyte sheet.
Figure 12:
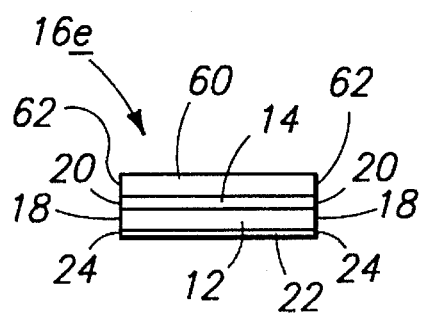
FIG. 12 is a view of a cut-out portion of the FIG. 11 sheet at a processing step subsequent to that shown by FIG. 11.

It would also be possible with any of the above-described embodiments to bond anode material to a sheet prior to formation of the individual cathode/solid electrolyte material composite pieces. Such is shown by way of example in FIGS. 11 and 12. A modified sheet 10e includes the same conductive substrate 22, cathode material 12 and solid electrolyte material 14. An anode layer 60 is bonded or otherwise adhesively adhered to solid electrolyte material 14. During the cutting step, the anode material would also be cut through preferably to define anode peripheral edges 62 which align with the other peripheral edges 20, 18 and 24.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method of forming a button-type battery comprising the following steps:

providing a sheet of cathode material bonded to solid electrolyte material;

cutting the cathode material and solid electrolyte material from the sheet into a plurality of composite cathode/solid electrolyte pieces which are individually sized and shaped to constitute the electrolyte and cathode components of a single button-type battery;

providing a pair of first and second terminal housing members in facing juxtaposition to one another, the first and second terminal housing members having respective peripheries;

providing one of the composite cathode/electrolyte pieces intermediate the juxtaposed first and second terminal housing members;

providing an anode intermediate the juxtaposed first and second terminal housing members, the anode being positioned to electrically connect with one of the first or second terminal housing members and the solid electrolyte, and the cathode being positioned to electrically connect with the other of the first or second terminal housing members;

providing electrically insulative sealing gasket material intermediate the first and second terminal housing member peripheries; and crimping the first and second terminal housing member peripheries together into an enclosed dry battery housing with the gasket material being interposed between the first and second terminal housing members to provide a fluid-tight seal and to provide electrical insulation therebetween.

2. The method of forming a button-type battery of claim 1 wherein the cutting step comprises defining cathode and solid electrolyte peripheral edges which align with one another.

3. The method of forming a button-type battery of claim 1 wherein the sheet is also provided with a conductive substrate to which the cathode material is adhered, the cutting step also comprising cutting through the conductive substrate.

4. The method of forming a button-type battery of claim 1 wherein the sheet is provided with anode material bonded to the solid electrolyte material, the cutting step also comprising cutting through the anode material to define a plurality of composite cathode/solid electrolyte/anode pieces.

5. The method of forming a button-type battery of claim 1 wherein the sheet is also provided with a conductive substrate to which the cathode material is adhered, the cutting step also comprising cutting through the conductive substrate and defining cathode, solid electrolyte and conductive substrate peripheral edges which align with one another.

6. The method of forming a button-type battery of claim 1 wherein the sheet is provided with anode material bonded to the solid electrolyte material, the cutting step also comprising cutting through the anode material to define a plurality of composite cathode/solid electrolyte/anode pieces having cathode, solid electrolyte and anode peripheral edges which align with one another.

7. The method of forming a button-type battery of claim 1 wherein the sheet is provided with a conductive substrate to which the cathode material is adhered and with anode material bonded to the solid electrolyte material, the cutting step also comprising cutting through the conductive substrate and the anode.

\* \* \* \* \*